US012762331B2

(12) United States Patent
Toyama et al.

(10) Patent No.: US 12,762,331 B2
(45) Date of Patent: Oct. 13, 2026

(54) DATA COMPARISON METHOD, DATA COMPARISON PROGRAM, AND INFORMATION PROCESSING DEVICE

(71) Applicant: TOYOTA JIDOSHA KABUSHIKI KAISHA, Toyota (JP)

(72) Inventors: Fumiya Toyama, Toyota (JP); Shinichi Takeuchi, Nisshin (JP); Shingo Noritake, Owariasahi (JP); Akira Murakami, Kasugai (JP); Ryo Yanagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 18/625,346

(22) Filed: Apr. 3, 2024

(65) Prior Publication Data

US 2025/0013818 A1 Jan. 9, 2025

(30) Foreign Application Priority Data

Apr. 3, 2023 (JP) ................................ 2023-060183

(51) Int. Cl.
*G06F 40/177* (2020.01)

(52) U.S. Cl.
CPC .................................. *G06F 40/177* (2020.01)

(58) Field of Classification Search
CPC ............................. G06F 40/177; G06F 40/194
See application file for complete search history.

(56) References Cited

U.S. PATENT DOCUMENTS 11,080,462 B2 * 8/2021 Currenti ................ G06F 40/197
12,210,508 B1 * 1/2025 Otto .................... G06F 16/2365
2003/0123732 A1 7/2003 Miyazaki et al.
2010/0241943 A1 * 9/2010 Massand ............... G06F 40/194 715/227
2021/0390296 A1 12/2021 En et al.
2022/0245325 A1 * 8/2022 Inoue ................ G06F 16/90344

FOREIGN PATENT DOCUMENTS

JP 11-328309 A 11/1999
JP 2021-197190 A 12/2021

* cited by examiner

*Primary Examiner* — Cao H Nguyen
(74) *Attorney, Agent, or Firm* — Oblon, McClelland, Maier & Neustadt, L.L.P.

(57) ABSTRACT

An information processing device acquires character strings in respective cells that are included in a first table and a second table in document data. When acquiring a character string, the device may identify the characters included in the character string by using a pre-trained model that has been trained in advance through machine learning. The device determines whether the second table corresponds to the first table based on similarities between character strings in cells that are included in the first table and character strings in cells that are included in the second table. When determining that the second table corresponds to the first table, the device identifies a difference between the character strings in the cells that are included in the first table and the character strings in the cells that are included in the second table and correspond to the cells included in the first table.

18 Claims, 4 Drawing Sheets

Fig.5

| | X11 | X12 |
|---|---|---|
| A11 | 0.9 | 0.2 |
| A12 | 0.2 | 0.7 |

Fig.6

| | X11~X12 | X21~X22 |
|---|---|---|
| A11~A12 | 0.8 | 0.2 |
| A21~A22 | 0.5 | 0.4 |
| A31~A32 | 0.2 | 1.0 |

Fig.7

| | | Document 200 | | |
|---|---|---|---|---|
| | | Table X | Table Y | Table Z |
| Document 100 | Table A | 0.9 | 0.6 | 0.3 |
| | Table B | 0.6 | 0.4 | 0.9 |
| | Table C | 0.6 | 0.4 | 0.5 |

DATA COMPARISON METHOD, DATA COMPARISON PROGRAM, AND INFORMATION PROCESSING DEVICE

CROSS-REFERENCE TO RELATED APPLICATIONS

This application is based upon and claims the benefit of priority from prior Japanese Patent Application No. 2023-060183, filed on Apr. 3, 2023, the entire contents of which are incorporated herein by reference.

BACKGROUND

The present disclosure relates to a data comparison method, a data comparison program, and an information processing device.

The character reading device disclosed in Japanese Laid-Open Patent Publication No. H11-328309 separates a character string and a frame border located near the character string from an original image. Subsequently, the character reading device extracts images of individual characters included in the character string. The character reading device then identifies the characters based on the extracted images of each individual character.

For example, a document containing a table may have been revised. In such a case, there may be a need to determine whether there have been any changes to the items in the table before and after the revision. If changes have occurred, it is necessary to identify which items in the table have been altered. However, the character reading device of the above document can only recognize characters. Therefore, the character reading device of the above document cannot determine whether there have been changes before and after the revision. Although the example provided here involves document revisions, the same issue arises when identifying differences between items in two similar tables.

SUMMARY

In a first general aspect, a data comparison method executed by an information processing device is provided. The method includes acquiring character strings in respective cells that are included in a first table in document data, acquiring character strings in respective cells that are included in a second table in the document data, the second table being different from the first table, determining whether the second table corresponds to the first table based on similarities between the character strings in the cells that are included in the first table and the character strings in the cells that are included in the second table, when determining that the second table corresponds to the first table, identifying a difference between the character strings in the cells that are included in the first table and the character strings in the cells that are included in the second table and correspond to the cells included in the first table.

In a second general aspect, a computer-readable medium storing a data comparison program to be executed by an information processing device is provided. Instructions included in the data comparison program includes acquiring character strings in respective cells that are included in a first table in document data, acquiring character strings in respective cells that are included in a second table in the document data, the second table being different from the first table, determining whether the second table corresponds to the first table based on similarities between the character strings in the cells that are included in the first table and the character strings in the cells that are included in the second table, and when determining that the second table corresponds to the first table, identifying a difference between the character strings in the cells that are included in the first table and the character strings in the cells that are included in the second table and correspond to the cells included in the first table.

In a third general aspect, an information processing device is configured to acquire character strings in respective cells that are included in a first table in document data, acquire character strings in respective cells that are included in a second table in the document data, the second table being different from the first table, determine whether the second table corresponds to the first table based on similarities between the character strings in the cells that are included in the first table and the character strings in the cells that are included in the second table, and when determining that the second table corresponds to the first table, identify a difference between the character strings in the cells that are included in the first table and the character strings in the cells that are included in the second table and correspond to the cells included in the first table.

BRIEF DESCRIPTION OF THE DRAWINGS

FIG. 5 is a diagram illustrating cell similarities.

FIG. 6 is a diagram illustrating row similarities.

FIG. 7 is a diagram illustrating table similarities.

DESCRIPTION OF THE PREFERRED EMBODIMENTS

Schematic Configuration of Data Comparison System

An embodiment of the present invention will be described below with reference to FIGS. 1 to 7. First, a schematic configuration of the data comparison system 10 will be described.

Figure 1:
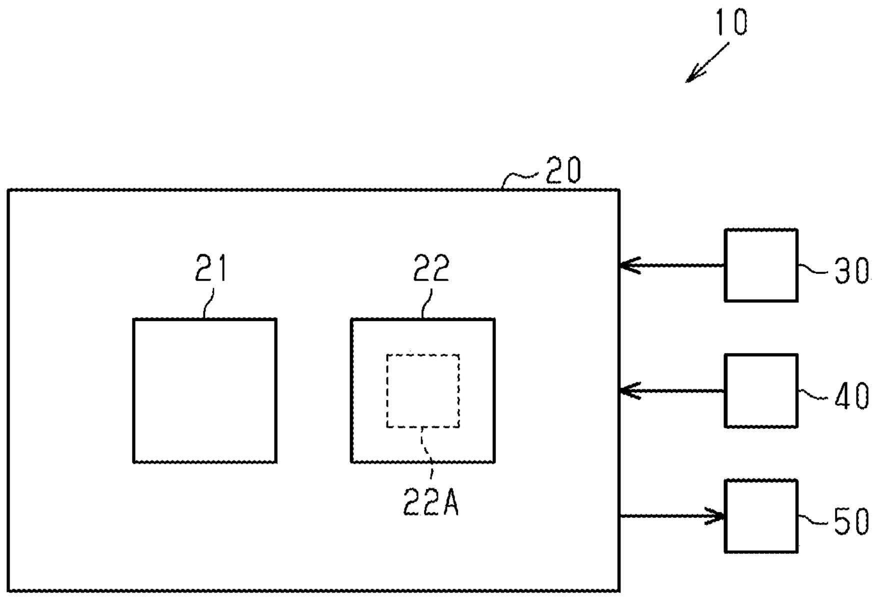
FIG. 1 is a schematic diagram of a data comparison system.

As shown in FIG. 1, the data comparison system 10 includes an information processing device 20, an input device 30, a camera 40, and a display 50.

The information processing device 20 includes an execution device 21 and a storage 22. An example of the execution device 21 is a central processing unit (CPU). The storage 22 includes a read-only memory (ROM), which can only be read, a volatile random-access memory (RAM), which can be read and written, and a nonvolatile storage, which can be read and written. The storage 22 stores various types of programs and various types of data in advance. The storage 22 stores in advance a data comparison program 22A as one of various programs. The execution device 21 realizes various processes by executing a program stored in the storage 22. The execution device 21 executes the data comparison program 22A stored in the storage 22 to realize various processes in the data-comparing method. An example of the information processing device 20 is a so-called personal computer.

The input device 30 includes, for example, a keyboard and a pointing device. The camera 40 can capture an image of a subject. Therefore, the camera 40 can photograph a document 100 and a document 200 to be described later. The display 50 can display various kinds of information.

Data Comparison Control

Next, data comparison control executed by the information processing device 20 will be described with reference to FIG. 2. The information processing device 20 executes the data comparison control by executing the data comparison program 22A. In the present embodiment, the information processing device 20 executes the data comparison control, for example, when the operator performs an operation for starting the data comparison control via the input device 30.

Figure 3:
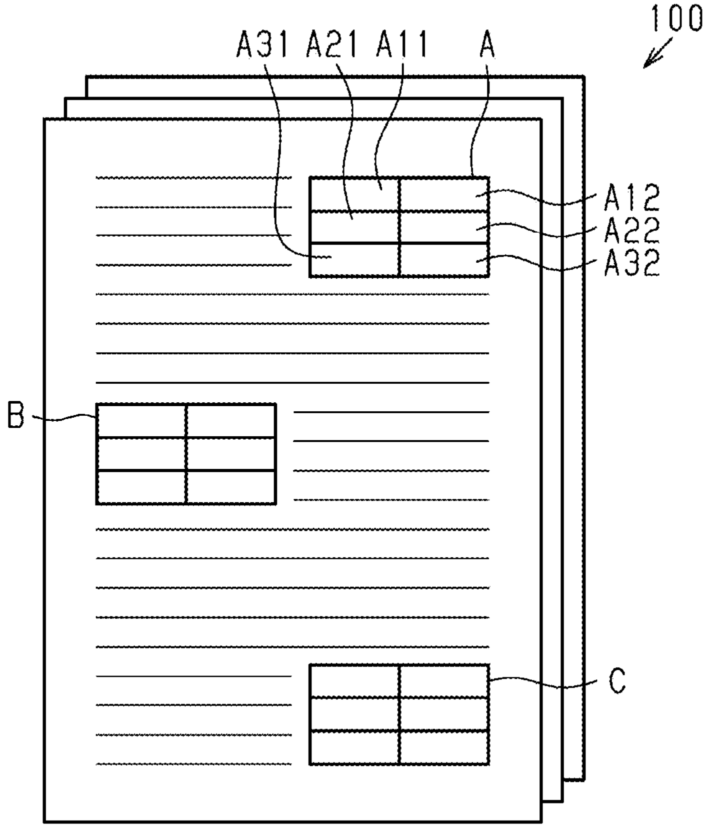
FIG. 3 is a diagram illustrating a document.
Figure 4:
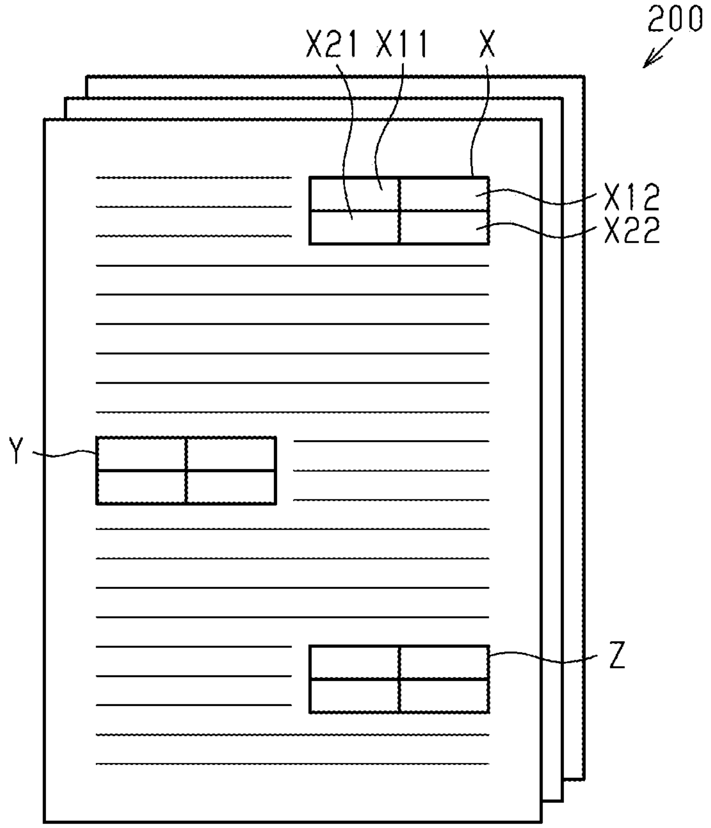
FIG. 4 is a diagram illustrating a document.

Hereinafter, as an example of the data comparison control, a process of comparing a table included in the document 100 with a table included in the document 200 will be described. As shown in FIG. 3, the document 100 includes a table A, a table B, and a table C. As shown in FIG. 4, the document 200 includes a table X, a table Y, and a table Z. In the present embodiment, each of the table A, the table B, and the table C included in the document 100 corresponds to the first table. In addition, each of the table X, the table Y, and the table Z included in the document 200 corresponds to a second table that is different from the first table. In the present embodiment, an example of the document 100 and the document 200 is an instruction manual attached when an automobile is purchased, that is, a so-called owner's manual. The document 200 is an owner's manual obtained by revising the document 100.

Figure 2:
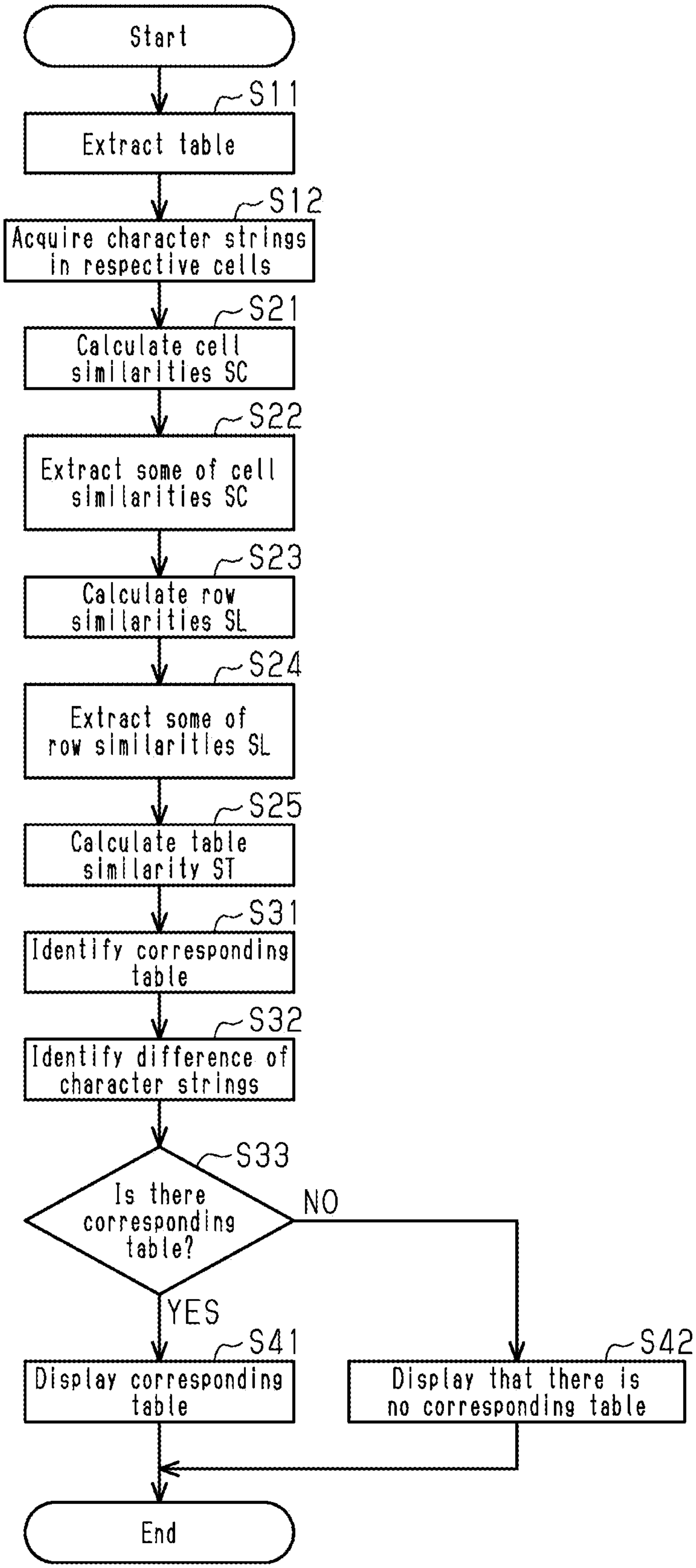
FIG. 2 is a flowchart showing a data comparison control.

As shown in FIG. 2, when the information processing device 20 starts the data comparison control, the information processing device 20 executes the process of step S11.

In step S11, the information processing device 20 acquires the image data of the documents 100 and 200 using the camera 40. Each of the image data acquired in step S11 is an example of a document. Further, the information processing device 20 extracts the table A, the table B, and the table C included in the document 100 from the image data of the document 100. Similarly, the information processing device 20 extracts the table X, the table Y, and the table Z included in the document 200 from the image data of the document 200. After step S11, the information processing device 20 advances the processing to step S12.

In step S12, the information processing device 20 acquires character strings in respective cells that are included in the table A. More specifically, the information processing device 20 acquires a character string from the image data of the document 100 by optical character recognition (OCR). At this time, the information processing device 20 identifies the characters included in the character string by using a pre-trained model that has been trained in advance by machine learning. As a configuration for identifying characters in this way, a well-known configuration described in, for example, Japanese Patent Application Laid-Open No. 11 (1999)-328309 can be used. Similarly, the information processing device 20 acquires character strings for all the cells included in the table A. Further, in the same manner as described above, the information processing device 20 acquires character strings in respective cells that are included in the table B, the table C, the table X, the table Y, and the table Z. After step S12, the information processing device 20 advances the processing to step S21.

In step S21, the information processing device 20 calculates a cell similarity SC which is a similarity between a character string in a cell included in the first table and a character string in a cell included in the second table. As a specific example, the information processing device 20 calculates a cell similarity SC between a character string in a cell included in the table A and a character string in a cell included in the table X. At this time, the information processing device 20 calculates the cell similarity SC for all combinations of the cells included in the table A and the cells included in the table X. For example, as shown in FIG. 3, it is assumed that the table A has three rows and two columns. Thus, the table A includes a total of six cells, from a cell A11 to a cell A32. As shown in FIG. 4, it is assumed that the table X is a table of two rows and two columns. Thus, the table X includes a total of four cells from a cell X11 to a cell X22. In this case, the information processing device 20 calculates, for example, a cell similarity SC between the character string in the cell A11 and the character string in the cell X11. Specifically, the information processing device 20 calculates the cell similarity SC by the following Expression (1).

$$\text{Cell Similarity } SC=(2\times NW3)/(NW1+NW2) \qquad \text{Expression (1)}$$

Here, NW1 is the number of characters in the character string in the cell A11. The NW2 is the number of characters in the character string in the cell X11. Further, the NW3 is the number of matched characters between the character string in the cell A11 and the character string in the cell X11. For example, it is assumed that the character string in the cell A11 is Engine1234. Further, it is assumed that the character string in the cell X11 is Engine1239. In this case, the NW1 is 10. Further, NW2 is 10. Further, the NW3 is 9. Therefore, the cell similarity SC is 0.9.

As described above, the information processing device 20 calculates the cell similarity SC for all the combinations of the cells included in the table A and the cells included in the table X. That is, the information processing device 20 calculates the cell similarity SC for each of the cell A11 and the cells X11 to X22. Further, the information processing device 20 calculates the cell similarity SC for each of the cell A12 and the cells X11 to X22. Similarly, the information processing device 20 calculates the cell similarity SC for each of the cell A21 to the cell A32 and the cell X11 to the cell X22. Therefore, in the above example, the information processing device 20 calculates a total of twenty four cell similarities SC for all the combinations of the cells included in the table A and the cells included in the table X.

Similarly, the information processing device 20 calculates the cell similarity SC between the character string in the cell included in the table A and the character string in the cell included in the table Y In addition, the information processing device 20 calculates a cell similarity SC between the character string in the cell included in the table A and the character string in the cell included in the table Z. Further, in the same manner as described above, the information processing device 20 calculates the cell similarity SC between the character string in the cell included in the table B and the character string in the cell included in the table X to the table Z. In addition, the information processing device 20 calculates a cell similarity SC between the character string in the cell included in the table C and the character string in the cell included in the table X to the table Z. Therefore, in the above-described example, the information processing device 20 calculates the cell similarity SC in a combination of nine tables in total for all combinations of the table A to the table C and the table X to the table Z. As shown in FIG. 2, after step S21, the information processing device 20 advances the process to step S22.

In step S22, the information processing device 20 arranges the calculated cell similarities SC for each row of the table A and for each row of the table X. Then, the information processing device 20 extracts a cell similarities SC including the highest value among the cell similarities SC for each row. In the present embodiment, the information processing device 20 extracts the top two cell similarities SC among the cell similarities SC. For example, consider the first row of the table A and the first row of the table X. At this time, the first row of the table A contains the cell A11 and the cell A12. Also, the first row of the table X includes the cell X11 and the cell X12. Therefore, in step S21 described above, the information processing device 20 calculates a total of four cell similarities SC as shown in FIG. 5 in the comparison between the first row of the table A and the first row of the table X. In this case, in step S22, the information processing device 20 extracts 0.9, which is the cell similarity SC between the cell A11 and the cell X11, and 0.7, which is the cell similarity SC between the cell A12 and the cell X12, from the total of four cell similarities SC. Similarly, the information processing device 20 extracts the cell similarity SC for all combinations of the rows included in the table A and the rows included in the table X in the table A and the table X.

Similarly to the above, the information processing device 20 extracts a cell similarities SC including the highest value among the cell similarities SC for each row with respect to the table A and the table Y In addition, the information processing device 20 extracts a cell similarities SC including the highest value among the cell similarities SC for each row with respect to the table A and the table Z. Further, in the same manner as described above, the information processing device 20 extracts a cell similarities SC including the highest value among the cell similarities SC for each row with respect to each of the table B and the tables X to Z. In addition, the information processing device 20 extracts a cell similarities SC including the highest value among the cell similarities SC for each row with respect to each of the table C and the tables X to Z. As shown in FIG. 2, after step S22, the information processing device 20 advances the process to step S23.

In step S23, the information processing device 20 calculates a row similarity SL based on the extracted cell similarity SC for each row. Specifically, the information processing device 20 calculates an average value of the extracted cell similarities SC for each row as the row similarity SL. The row similarity SL is a similarity between a character string in a row included in the first table and a character string in a row included in the second table. For example, when focusing on the first row of the table A and the first row of the table X, the cell similarity SC for each row extracted by the information processing device 20 in step S22 described above is 0.9 and 0.7. In this case, as illustrated in FIG. 6, the information processing device 20 calculates 0.8, which is the average value of 0.9 and 0.7, as the row similarity SL between the first row of the table A and the first row of the table X. Similarly, the information processing device 20 calculates the row similarity SL for all combinations of the rows included in the table A and the rows included in the table X in the table A and the table X.

Similarly to the above, the information processing device 20 calculates the row similarity SL based on the cell similarity SC for each extracted row for the table A and the table Y In addition, the information processing device 20 calculates the row similarity SL based on the cell similarity SC for each extracted row with respect to the table A and the table Z. Further, in the same manner as described above, the information processing device 20 calculates the row similarity SL based on the extracted cell similarity SC for each row for each of the table B and the tables X to Z. In addition, the information processing device 20 calculates the row similarity SL based on the cell similarity SC for each extracted row for each of the table C and the tables X to Z. As shown in FIG. 2, after step S23, the information processing device 20 advances the process to step S24.

In step S24, the information processing device 20 extracts a plurality of row similarities SL including the highest value among the calculated row similarities SL for each combination of the tables. In the present embodiment, the information processing device 20 extracts the top two row similarities SL among the plurality of row similarities SL. For example, when attention is paid to the combination of the table A and the table X, the information processing device 20 calculates a total of six row similarities SL as shown in FIG. 6 in the above-described step S23. In this case, in step S24, the information processing device 20 extracts 0.8 and 1.0 as the top two row similarities SL from the calculated total of six row similarities SL.

Similarly, the information processing device 20 extracts a plurality of row similarities SL including the highest value among the calculated row similarities SL for the combination of the table A and the table Y Further, the information processing device 20 extracts a plurality of row similarities SL including the highest value among the calculated row similarities SL for the combination of the table A and the table Z. Further, in the same manner as described above, the information processing device 20 extracts a plurality of row similarities SL including the highest value among the calculated row similarities SL for each combination of the table B and the tables X to Z. In addition, the information processing device 20 extracts a plurality of row similarities SL including the highest value among the calculated row similarities SL for each combination of the table C and the tables X to Z. As shown in FIG. 2, after step S24, the information processing device 20 advances the process to step S25.

In step S25, the information processing device 20 calculates a table similarity ST for each combination of tables based on the extracted row similarities SL. Specifically, the information processing device 20 sets the average value of the extracted row similarities SL as the table similarity ST. For example, focusing on the combination of the table A and the table X, the row similarities SL extracted by the information processing device 20 in step S24 described above are 0.8 and 1.0. In this case, as illustrated in FIG. 7, the information processing device 20 calculates 0.9, which is the average value of 0.8 and 1.0, as the table similarity ST in the table A and the table X.

Similarly, the information processing device 20 calculates the table similarity ST based on the extracted row similarity SL for the combination of the table A and the table Y Further, the information processing device 20 calculates the table similarity ST based on the extracted row similarity SL for the combination of the table A and the table Z. Further, in the same manner as described above, the information processing device 20 calculates the table similarity ST based on the extracted row similarity SL for each combination of the table B and the tables X to Z. The information processing device 20 calculates the table similarity ST based on the extracted row similarity SL for each combination of the table C and the tables X to Z. As shown in FIG. 2, after step S25, the information processing device 20 advances the process to step S31.

In step S31, the information processing device 20 identifies a corresponding table based on the calculated table similarity ST. Specifically, the information processing device 20 determines whether the table similarity ST is greater than or equal to a predetermined specified value for each combination of tables. Then, the information processing device 20 determines that the second table corresponds to the first table in a case in which the table similarity ST is greater than or equal to a specified value. An example of the specified value is 0.9. For example, when the table included in the document 100 is compared with the table included in the document 200, the information processing device 20 calculates a total of nine table similarities ST as shown in FIG. 7. In this example, the table similarity ST of the table A and the table X is 0.9. As a result, the information processing device 20 determines that the table A and the table X correspond to each other. The table similarity ST of the table B and the table Z is 0.9. As a result, the information processing device 20 determines that the table B and the table Z correspond to each other. As shown in FIG. 2, after step S31, the information processing device 20 advances the process to step S32.

In step S32, the information processing device 20 identifies a difference between a character string in a cell included in the first table and a character string in a cell included in the second table and corresponding to the cell included in the first table, for the first table and the second table determined to correspond to each other in step S31. In other words, when it is determined that the second table corresponds to the first table in step S31, the information processing device 20 identifies the difference between the character string in the cell that is included in the first table and the character string in the cell that is included in the second table and corresponds to the cell included in the first table. The information processing device 20 identifies the difference between the character strings as follows, for example. As a specific example, in a case in which the table A and the table X correspond to each other, the information processing device 20 determines that the cell of the first table and the cell of the second table correspond to each other when the cell similarity SC is greater than or equal to a specified value among all the cell similarities SC of the table A and the table X. Here, it is assumed that the cell A11 included in the table A corresponds to the cell X11 included in the table X. Further, it is assumed that the character string in the cell A11 is Engine1234. Further, it is assumed that the character string in the cell X11 is Engine1239. In this case, the information processing device 20 identifies 4 in the character string Engine1234 in the cell A11 as the difference of the character strings. In addition, the information processing device 20 identifies 9 in the character string Engine1239 in the cell X11 as the difference of the character string. After step S32, the information processing device 20 advances the processing to step S33.

In step S33, the information processing device 20 determines whether there is a table corresponding to the table included in the document 100 and the table included in the document 200. In step S33, when the information processing device 20 determines that there is a corresponding table (S33:YES), the information processing device 20 advances the process to step S41.

In step S41, the information processing device 20 displays the corresponding table on the display 50. Specifically, the information processing device 20 outputs a control signal to the display 50 to display a corresponding table on the display 50. At this time, the information processing device 20 displays the corresponding tables on the display 50 side by side, for example. Further, the information processing device 20 displays the difference between the character strings identified in step S32 on the display 50. In the present embodiment, the information processing device 20 displays the difference between the identified character strings on the display 50, for example, in a highlighted manner. For example, when the table A and the table X correspond to each other, the information processing device 20 displays the table A and the table X side by side on the display 50. Further, for example, it is assumed that the cell A11 included in the table A and the cell X11 included in the table X correspond to each other and there is a difference between the character string in the cell A11 and the character string in the cell X11. Further, it is assumed that the character string in the cell A11 is Engine1234. Further, it is assumed that the character string in the cell X11 is Engine1239. In this case, the information processing device 20 highlights 4 in the character string Engine1234 in the cell A11 and displays it on the display 50. In addition, the information processing device 20 highlights 9 in the character string Engine1239 in the cell X11 and displays it on the display 50. After step S41, the information processing device 20 ends the current data comparison control.

On the other hand, in step S33 described above, when the information processing device 20 determines that there is no corresponding table (S33:NO), the information processing device 20 advances the process to step S42.

In step S42, the information processing device 20 displays that there is no corresponding table on the display 50. Specifically, the information processing device 20 outputs a control signal to the display 50 to display that there is no corresponding table on the display 50. After step S42, the information processing device 20 ends the current data comparison control.

Operation of Present Embodiment

The information processing device 20 executes the data comparison control, for example, for the document 100 and the document 200. At this time, in step S21, the information processing device 20 calculates the cell similarity SC, which is the similarity between the character string in a cell of the first table included in the document 100 and the character string in a cell of the second table included in the document 200. In step S23, the information processing device 20 calculates the row similarity SL based on the cell similarity SC for each row of the first table and the second table. Further, in step S25, the information processing device 20 calculates the table similarity ST based on the row similarity SL of the first table and the second table. In step S31, the information processing device 20 determines whether the table similarity ST is greater than or equal to the predetermined specified value. Further, the information processing device 20 determines that the second table corresponds to the first table when the table similarity ST is greater than or equal to the specified value. When determining that the second table corresponds to the first table in step S31, the information processing device 20 identifies, in step S32, the difference between the character string in the cell that is included in the first table and the character string in the cell that is included in the second table and corresponds to the cell included in the first table.

Advantages of Present Embodiment (1) An example will now be considered in which, when the document 100 is revised to the document 200, the table A included in the document 100 is revised to the table X included in the document 200. In this case, the cell similarity SC, which is the similarity between the character strings in the cells included in the table A and the character string in the cell included in the table X, tends to increase. Therefore, the row similarity SL and the table similarity ST between the table A and the table X are also high. Then, when the table similarity ST is greater than or equal to the specified value, the information processing device 20 determines that the table A and the table X correspond to each other. Therefore, for example, even if the table A is revised to the table X, it is possible to determine whether the table A and the table X correspond to each other, that is, whether the table X is a revised version of the table A, based on the cell similarity SC. Then, for example, when the cell A11 included in the table A and the cell X11 included in the table X correspond to each other and there is a difference between the character string in the cell A11 and the character string in the cell X11, the difference between the character strings in the cell A11 and the cell X11 can be identified.

(2) An example will now be considered in which the table X is a revised version of the table A, while the table Y is a completely different type from the table A. In this case, it is highly necessary to identify the difference between the character strings in the cells included in the table A and the table X, while it is less necessary to identify the difference between the character strings in the cells included in the table A and the table Y.

In this regard, in a case in which the table A and the table X correspond to each other, in other words, for example, in a case in which the table A is revised to the table X or described contents of the table A and the table X are similar to each other, the information processing device 20 identifies the difference between character strings in cells included in the table A and the table X. This makes it possible to identify the difference between the character strings in the cells included in the table A and the table X in a situation in which it is highly necessary to identify the difference between the character strings in the cells included in the table A and the table X.

(3) For example, when the table A is revised to the table X, the cell similarity SC of a cell in which the character string is not changed by the revision is relatively high. In contrast, the cell similarity SC of a cell in which the character string is changed by the revision is relatively low. Therefore, if it is determined whether the table A and the table X correspond to each other based on the average value of the cell similarities SC of all the combinations of the cells included in the table A and the cells included in the table X, the average value is relatively low, and thus it is likely to be determined that the table A and the table X do not correspond to each other.

In this regard, in step S22, the information processing device 20 extracts cell similarities SC including the highest value among the calculated cell similarities SC for the respective rows. Then, in step S23, the information processing device 20 calculates the row similarity SL based on the extracted cell similarities SC for the respective rows. In other words, the information processing device 20 determines whether the table A and the table X correspond to each other, for example, based on the cell similarity SC of the cell which is not changed by the revision or the change of which is small. As a result, for example, in a case in which the table A is revised to the table X, even if the cell similarity SC of the cell in which the character string is changed by the revision is relatively low, it is reliably determined that the table A and the table X correspond to each other.

(4) For example, even in a case in which the table A is not revised to the table X, some of the cell similarities SC of the table A and the table X may be relatively high simply because the table A and the table X are similar to each other. On the other hand, for example, when the table A is revised to the table X, there is a high possibility that some of the rows included in the table A are deleted, or a new row is added to the table A. As a result, not only some of the cell similarities SC of the table A and the table X are relatively high, but also some of the row similarities SL of the table A and the table X tend to be noticeably high.

In this regard, in step S24, the information processing device 20 extracts row similarities SL including the highest value among the calculated row similarities SL. Then, in step S25, the information processing device 20 calculates the table similarity SL based on the extracted row similarities ST. Thus, for example, in a situation in which there is a higher possibility that the table A has been revised to the table X, it is possible to determine that the table A and the table X correspond to each other.

Modifications

The above-described embodiment may be modified as follows. The above-described embodiment and the following modifications can be combined as long as the combined modifications remain technically consistent with each other.

In the above embodiment, the data comparison control may be changed.

For example, in step S11, the configuration for extracting the table may be changed. As a specific example, when the storage 22 stores the document data of the document 100 and the document 200 in advance, the information processing device 20 may extract the table A, the table B, the table C, the table X, the table Y, and the table Z from the document data stored in the storage 22. The document data may be data in a format different from that of the image data. That is, the format of the document data can be changed. The document from which the table is extracted in step S11 may be one of the documents 100 and 200. That is, the information processing device 20 may extract the first table and the second table from the same document data.

For example, in step S12, the configuration for acquiring character strings in respective cells may be changed. As a specific example, when the storage 22 stores the document data of the document 100 and the document 200 in advance, the information processing device 20 may acquire the character strings in respective cells from the document data stored in the storage 22.

For example, in step S23, the calculation configuration of the row similarity may be changed. As a concrete example, the information processing device 20 may calculate the row similarity SL of the row based on all the cell similarities SC included in each row calculated in step S21. In this configuration, the process of step S22 can be omitted.

For example, in step S23, the column similarity may be calculated instead of the row similarity. As a concrete example, the information processing device 20 may calculate the column similarity of the column based on the cell similarities SC included in each column calculated in step S21. Here, the column similarity is a similarity between a character string in a column included in the first table and a character string in a column included in the second table. In this case, in step S22, the information processing device 20 preferably extracts a cell similarities SC including the highest value among the calculated cell similarities SC for each column. The process of step S22 may be omitted.

For example, in step S25, the calculation configuration of the table similarity ST may be changed. As a concrete example, the information processing device 20 may calculate the table similarity ST on the basis of all the row similarities SL calculated in the step S23. In this configuration, the process of step S24 can be omitted.

In the above embodiment, the configuration of the data comparison system 10 may be changed.

For example, the data comparison system 10 may employ an input device that converts a document or the like into image data, a so-called scanner, instead of the camera 40.

The invention claimed is:

1. A data comparison method executed by an information processing device, the method comprising:

acquiring character strings in respective cells that are included in a first table in document data;

acquiring character strings in respective cells that are included in a second table in the document data, the second table being different from the first table;

calculating cell similarities for all combinations of the cells that are included in the first table and the cells that are included in the second table, each cell similarity being a similarity between the character string in one of the cells that are included in the first table and the character string in one of the cells that are included in the second table;

arranging the calculated cell similarities for each row of the first table and for each row of the second table, and extracting a plurality of cell similarities including a highest value among the cell similarities for each row;

calculating row similarities based on average values of the extracted cell similarities for respective rows, each row similarity being a similarity between a character string in a row included in the first table and a character string in a row included in the second table;

extracting a plurality of row similarities including a highest value among the calculated row similarities for each combination of the first and second tables;

determining that the second table corresponds to the first table in a case in which a table similarity is greater than or equal to a predetermined specified value, the table similarity being an average value of the extracted row similarities; and when determining that the second table corresponds to the first table, identifying a difference between the character strings in the cells that are included in the first table and the character strings in the cells that are included in the second table and correspond to the cells included in the first table.

2. A non-transitory computer-readable medium storing a data comparison program to be executed by an information processing device, wherein instructions included in the data comparison program includes:

acquiring character strings in respective cells that are included in a first table in document data;

acquiring character strings in respective cells that are included in a second table in the document data, the second table being different from the first table;

calculating cell similarities for all combinations of the cells that are included in the first table and the cells that are included in the second table, each cell similarity being a similarity between the character string in one of the cells that are included in the first table and the character string in one of the cells that are included in the second table;

arranging the calculated cell similarities for each row of the first table and for each row of the second table, and extracting a plurality of cell similarities including a highest value among the cell similarities for each row;

calculating row similarities based on average values of the extracted cell similarities for respective rows, each row similarity being a similarity between a character string in a row included in the first table and a character string in a row included in the second table;

extracting a plurality of row similarities including a highest value among the calculated row similarities for each combination of the first and second tables;

determining that the second table corresponds to the first table in a case in which a table similarity is greater than or equal to a predetermined specified value, the table similarity being an average value of the extracted row similarities; and when determining that the second table corresponds to the first table, identifying a difference between the character strings in the cells that are included in the first table and the character strings in the cells that are included in the second table and correspond to the cells included in the first table.

3. An information processing device comprising:

a processor configured to acquire character strings in respective cells that are included in a first table in document data;

acquire character strings in respective cells that are included in a second table in the document data, the second table being different from the first table;

calculate cell similarities for all combinations of the cells that are included in the first table and the cells that are included in the second table, each cell similarity being a similarity between the character string in one of the cells that are included in the first table and the character string in one of the cells that are included in the second table;

arrange the calculated cell similarities for each row of the first table and for each row of the second table, and extract a plurality of cell similarities including a highest value among the cell similarities for each row;

calculate row similarities based on average values of the extracted cell similarities for respective rows, each row similarity being a similarity between a character string in a row included in the first table and a character string in a row included in the second table;

extract a plurality of row similarities including a highest value among the calculated row similarities for each combination of the first and second tables;

determine that the second table corresponds to the first table in a case in which a table similarity is greater than or equal to a predetermined specified value, the table similarity being an average value of the extracted row similarities; and when determining that the second table corresponds to the first table, identify a difference between the character strings in the cells that are included in the first table and the character strings in the cells that are included in the second table and correspond to the cells included in the first table.

4. The data comparison method according to claim 1, wherein the cell similarities are each calculated using:

$$SC=(2\times NW3)/(NW1+NW2),$$

where SC represents one of the cell similarities, NW1 represents a number of characters in the character string in one of the cells that are included in the first table, NW2 represents a number of characters in the character string in one of the cells that are included in the second table, and NW3 represents a number of characters matched between the character string in the one of the cells that are included in the first table and the character string in the one of the cells that are included in the second table.

5. The data comparison method according to claim 1, wherein the extracted cell similarities including the highest value are top two cell similarities among the cell similarities arranged for each row of the first table and for each row of the second table.

6. The data comparison method according to claim 1, wherein the extracted row similarities including the highest value are top two row similarities among the calculated row similarities.

7. The data comparison method according to claim 1, wherein the predetermined specified value is 0.9.

8. The data comparison method according to claim 1, wherein the document data includes image data of a first document and image data of a second document, and the method further comprises extracting the first table from the image data of the first document and extracting the second table from the image data of the second document.

9. The non-transitory computer-readable medium according to claim 2, wherein the cell similarities are each calculated using:

$$SC=(2\times NW3)/(NW1+NW2),$$

where SC represents one of the cell similarities, NW1 represents a number of characters in the character string in one of the cells that are included in the first table, NW2 represents a number of characters in the character string in one of the cells that are included in the second table, and NW3 represents a number of characters matched between the character string in the one of the cells that are included in the first table and the character string in the one of the cells that are included in the second table.

10. The non-transitory computer-readable medium according to claim 2, wherein the extracted cell similarities including the highest value are top two cell similarities among the cell similarities arranged for each row of the first table and for each row of the second table.

11. The non-transitory computer-readable medium according to claim 2, wherein the extracted row similarities including the highest value are top two row similarities among the calculated row similarities.

12. The non-transitory computer-readable medium according to claim 2, wherein the predetermined specified value is 0.9.

13. The non-transitory computer-readable medium according to claim 2, wherein the document data includes image data of a first document and image data of a second document, and the instructions further comprises extracting the first table from the image data of the first document and extracting the second table from the image data of the second document.

14. The information processing device according to claim 3, wherein the cell similarities are each calculated using:

$$SC=(2\times NW3)/(NW1+NW2),$$

where SC represents one of the cell similarities, NW1 represents a number of characters in the character string in one of the cells that are included in the first table, NW2 represents a number of characters in the character string in one of the cells that are included in the second table, and NW3 represents a number of characters matched between the character string in the one of the cells that are included in the first table and the character string in the one of the cells that are included in the second table.

15. The information processing device according to claim 3, wherein the extracted cell similarities including the highest value are top two cell similarities among the cell similarities arranged for each row of the first table and for each row of the second table.

16. The information processing device according to claim 3, wherein the extracted row similarities including the highest value are top two row similarities among the calculated row similarities.

17. The information processing device according to claim 3, wherein the predetermined specified value is 0.9.

18. The information processing device according to claim 3, wherein the document data includes image data of a first document and image data of a second document, and the processor is further configured to extract the first table from the image data of the first document and extract the second table from the image data of the second document.

* * * * *